(No Model.) 2 Sheets—Sheet 1.
A. ENGELMANN.
COUPLING FOR HEMP AND WIRE ROPES.
No. 315,490. Patented Apr. 14, 1885.
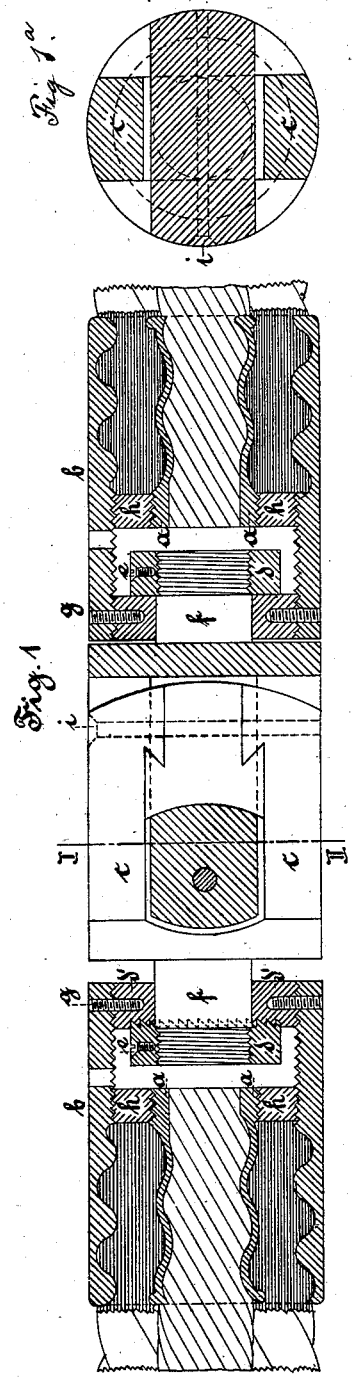
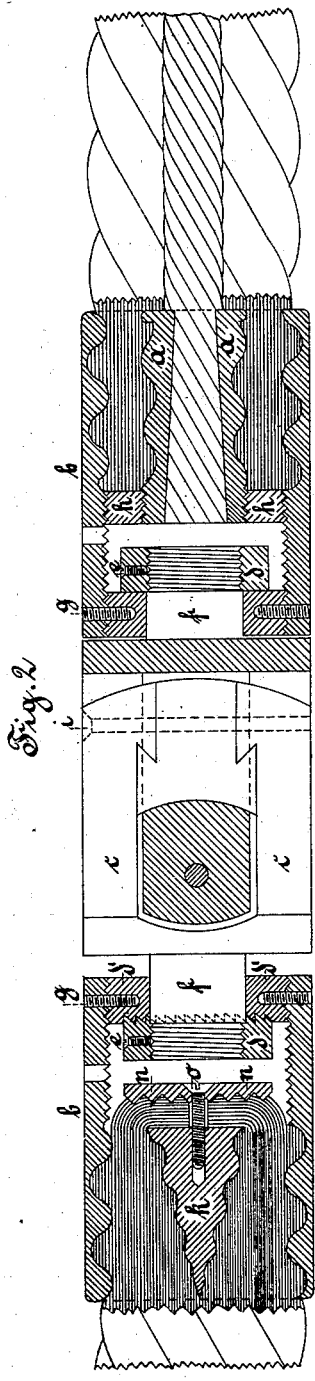
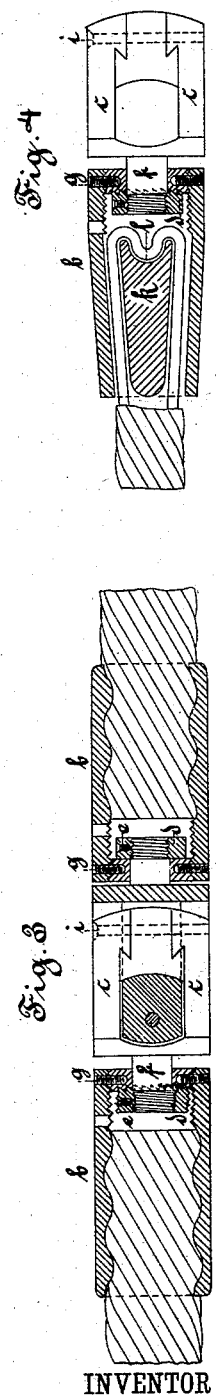
WITNESSES:
Fr. Meyer
W. Müller
INVENTOR:
Anton Engelmann.
BY
Hugo Srxky
ATTORNEY (No Model.)
A. ENGELMANN.
COUPLING FOR HEMP AND WIRE ROPES.
No. 315,490. Patented Apr. 14, 1885.
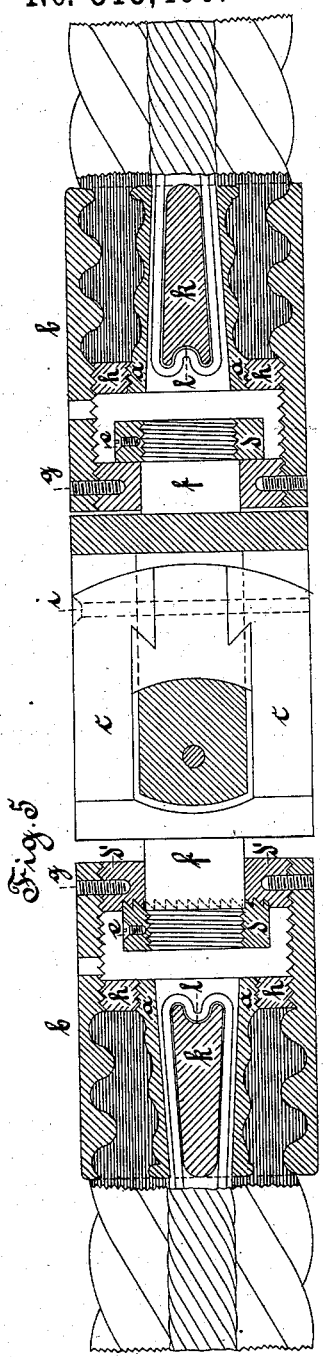
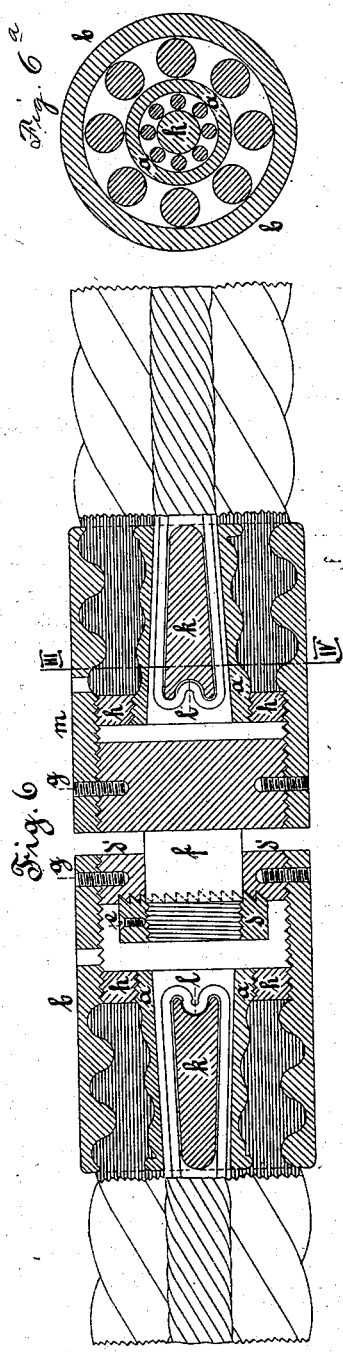
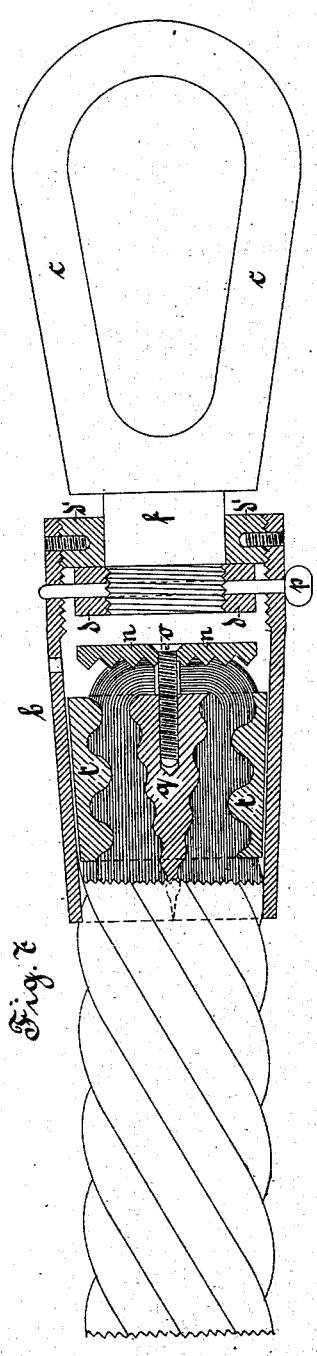
WITNESSES:
Fr. Meier
W. Müller
INVENTOR:
Anton Engelmann.
BY
Hugo _____
ATTORNEYS.

UNITED STATES PATENT OFFICE.

ANTON ENGELMANN, OF HANOVER, PRUSSIA, GERMANY.

COUPLING FOR HEMP AND WIRE ROPES.

SPECIFICATION forming part of Letters Patent No. 315,490, dated April 14, 1885.

Application filed June 17, 1884. (No model.)

*To all whom it may concern:*

Be it known that I, ANTON ENGELMANN, a subject of the King of Prussia, residing at Hanover, in the Province of Hanover and Kingdom of Prussia, German Empire, have invented certain new and useful Improvements in Couplings for Hemp and Wire Ropes, of which the following is a specification, reference being had therein to the accompanying drawings.

In said drawings, Figure 1 represents a longitudinal section through a coupling embodying my invention, portions of the rope being also shown, partly in elevation, partly in section. Fig. 1$^a$ represents a cross-section on the line I II of Fig. 1. Fig. 2 represents a view, similar to Fig. 1, of a modified form of my coupling. Fig. 3 represents, on a smaller scale, a similar view of another form of my coupling. Fig. 4 represents a similar view of another form of my coupling. Figs. 5, 6, and 7 represent similar views, enlarged, of other forms of my coupling; and Fig. 6$^a$ represents a cross-section on the line III IV of Fig. 6.

This invention relates to couplings for ropes, either of wire or vegetable fiber; and it consists in the peculiar construction and combination of parts hereinafter set forth and claimed.

The outer diameter of the shell $b$ of this coupling is of the same size as the diameter of the rope, so that the outer surface of the shell $b$ of the coupling is on a straight line with that of the rope. Besides this, the entire length of the coupling is as short as possible to enable it to take hold well of the transmission-disk.

This coupling consists of the outer shell, $b$, which is provided inside with a very coarse screw-thread for the reception of the end of the rope, and a sharp fine thread for the reception of the disks or internally screw-threaded collars $d'$ and $h$, which are connected with the movable eye $c$. On the lower end of this eye $c$ the two collars $d\ d'$ are placed, and the first of them is screwed thereon and secured by means of the pin-screws $e$, whereas the second is movable on the bolt $f$ of the eye $c$, but yet screwed in the shell $b$ and fastened by means of screw-pins $g$ to the shell $b$. On the one half of the coupling the surfaces of the disks $d$ and $d'$, which touch each other, are provided with ratchets, so that the eye $c$, and with it the wire or hemp rope, can turn in one direction only, and so that a turning back of the eye and of the rope is prevented by the ratchets of the disks $d$ and $d'$. The disks $d$ and $d'$ of the second part of the coupling have no ratchets. In case, then, that a wire rope has to be provided with a coupling, the end of the former is made red-hot and a thread corresponding with the coupling-box $a$ is pressed into the end of the rope, and the latter is then screwed into the coupling-box $a$, intended for its reception, Figs. 1 and 3. The hemp wrapped round the end of the wire rope squeezes itself in between the coupling-box $a$ and the shell $b$, which is connected with the former by means of disk $h$.

Between the disk $h$ and the disk $d$ and eye $c$ an intermediate space is left as high as the ratchets fixed on the disks $d$ and $d'$, so that when the eye or the rope turns, the disk $d$ can lift itself off $d'$.

In case of a wire rope not served with hemp, or in case of a hemp rope, the coupling-box $a$ and disk $h$ are omitted, Fig. 3.

In the rope-couplings used as yet the eye was worn out in a short time by the tractive power of the stretched rope, and in order to prevent the whole coupling becoming useless thereby the eyes $c$ are provided with removable dovetail-shaped insertion-pieces fastened by screw $i$. The coarse round thread on the inner side of the coupling-box $a$ can likewise be omitted, and in that case a thread is not pressed into the end of the wire rope, but the latter is simply shoved into the smooth coupling-box.

Another arrangement for fastening couplings to wire ropes is shown in Fig. 4. In this case, the end of the wire rope having been shoved into the coupling-box $a$, a round wedge, $k$, with a grooved head, $l$, is driven into the core of it. The wire ends of the rope are bent into the groove $l$ and soldered in there, so that the conical-shaped end of the rope cannot extricate itself from the coupling-box. This arrangement can likewise be employed successfully with wire ropes served with hemp. (See Fig. 5.) Fig. 6 represents a coupling the two halves of which are not connected pliably by eyes $c$, but by a stiff shell, $m$, which are intended for use on disks of large dimensions.

Fig. 7 shows the connection or joint of a hemp rope with a coupling or with an eye. Instead of a round wedge provided with a hollow, a wedge with a screw-shaped thread, $q$, is employed. The single strands of the rope are laid between this wedge and a disk, $n$, provided with teeth; but the latter is pressed firmly onto the screw-shaped wedge by means of screw $o$. In order to secure the rope still better, a second conical shell, $t$, provided with a coarse thread, is laid into the outer shell, $b$. The eye $c$ is fastened together with the disk $d$, screwed onto its end, by means of pin $p$, which passes through shell $b$.

The advantages of this invention consist, chiefly, in the following points: first, that in dry or wet weather, or when necessary owing to the unavoidable turning of new wire or hemp ropes on transmissions, the rope need not be taken off the disks, but can be shortened or lengthened, as required, by turning the eye $c$ by means of a hook-key, which can be done by one man; second, that the joining of rope ends provided with the coupling shown in Fig. 4 can be effected by a simple stiff shell.

I claim as my invention—

1. A shell provided with coarse internal screw-threads for engaging with the end of a rope, and internal threads for holding a collar, in combination with said collar, a coupling eye or link, and a collar, $d$, detachably fastened on the bolt of said eye within said shell in order that said eye may be held by collars, substantially as set forth.

2. The collars or disks $d\ d'$, having interlocking ratchet-teeth which allow them to turn in one direction only, in combination with a coupling-eye having one of said disks or collars fast on its bolt and the other loose thereon, and the shell $b$, which is screw-threaded on the latter collar, and provided with coarse internal screw-threads for holding a rope, substantially as set forth.

3. In a rope-coupling, the combination of the shell $b$ and the inner coupling-box, $a$, with the collar $h$, whereby they are connected, substantially as set forth.

4. The removable dovetailed insertion-pieces, in combination with the eyes or links and the screws $i$, which fasten them thereto.

In testimony whereof I affix my signature in presence of two witnesses.

ANTON ENGELMANN.

Witnesses:
WILLIAM C. FOX,
JOH. KRACKE.